(12) United States Patent
Lin et al.

(10) Patent No.: US 11,566,833 B2
(45) Date of Patent: Jan. 31, 2023

(54) CONTAINER ENERGY STORAGE SYSTEM

(71) Applicant: DELTA ELECTRONICS, INC., Taoyuan (TW)

(72) Inventors: Mu-Min Lin, Taoyuan (TW); Chin-Ming Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 285 days.

(21) Appl. No.: 16/819,205

(22) Filed: Mar. 16, 2020

(65) Prior Publication Data

US 2021/0164718 A1 Jun. 3, 2021

(30) Foreign Application Priority Data

Nov. 29, 2019 (TW) ................................ 108215955

(51) Int. Cl.
| | | |
|---|---|---|
| *F25D 11/00* | (2006.01) | |
| *F25D 11/02* | (2006.01) | |
| *B65D 88/12* | (2006.01) | |

(52) U.S. Cl.
CPC .......... *F25D 11/003* (2013.01); *B65D 88/121* (2013.01); *B65D 88/127* (2013.01); *F25D 11/02* (2013.01); *F25D 2700/123* (2013.01); *Y02E 60/10* (2013.01)

(58) Field of Classification Search
CPC .. B65D 88/126; B65D 88/125; B65D 88/124; B65D 88/123; B65D 88/122; B65D 88/129; B65D 88/12; B65D 81/00; B65D 88/121; B65D 88/127; F25D 11/003; F25D 11/02; F25D 2700/123; Y02E 60/10; H01M 10/613; H01M 10/663; H01M 50/256; H01M 50/207

See application file for complete search history.

(56) References Cited

U.S. PATENT DOCUMENTS

| | | | | |
|---|---|---|---|---|
| 5,253,776 | A * | 10/1993 | Decroix | B65D 77/0466 220/625 |
| 5,292,012 | A * | 3/1994 | Davis | B60P 3/224 220/1.5 |
| 6,227,397 | B1 * | 5/2001 | Kim | B65D 88/121 220/8 |
| 6,247,594 | B1 * | 6/2001 | Garton | B65D 19/385 220/23.91 |
| 6,494,334 | B1 * | 12/2002 | Cheng | B65D 88/005 220/8 |
| 6,516,965 | B1 * | 2/2003 | Perkins | B65D 77/061 220/9.4 |

(Continued)

FOREIGN PATENT DOCUMENTS

| | | |
|---|---|---|
| CN | 103376830 A | 10/2013 |
| TW | M264736 U | 5/2005 |

*Primary Examiner* — Kareen K Thomas
(74) *Attorney, Agent, or Firm* — CKC & Partners Co., LLC (57) ABSTRACT

A container energy storage system is provided in this disclosure. The system includes a container and a plurality of functional assemblies. The container includes a container frame and a bottom plate. The container frame is formed a plurality of openings and a hollow main body. The bottom plate is disposed at the bottom of the container frame and is fixedly connected to the container frame. The functional assemblies are disposed in the hollow main body and located above the bottom plate.

9 Claims, 6 Drawing Sheets

(56) References Cited

U.S. PATENT DOCUMENTS

| | | | | |
|---|---|---|---|---|
| 6,651,703 | B2* | 11/2003 | Gershtein | F17C 13/083 |
| | | | | 141/311 A |
| 6,691,885 | B2* | 2/2004 | Brown | B65D 19/12 |
| | | | | 220/6 |
| 7,322,227 | B2* | 1/2008 | Zhou | G01M 3/186 |
| | | | | 222/110 |
| 7,913,511 | B2 | 3/2011 | Meyer et al. | |
| 7,997,213 | B1* | 8/2011 | Gauthier | B65D 88/022 |
| | | | | 294/67.1 |
| 7,997,441 | B2* | 8/2011 | Marcel | B65D 88/128 |
| | | | | 206/386 |
| 9,517,815 | B1* | 12/2016 | Altman | B63B 25/08 |
| 9,605,424 | B2* | 3/2017 | Bikker | E04B 1/34336 |
| 2003/0006235 | A1* | 1/2003 | Przytulla | B65D 77/0466 |
| | | | | 206/386 |
| 2003/0024926 | A1* | 2/2003 | Karpisek | B65D 77/061 |
| | | | | 206/386 |
| 2005/0011890 | A1* | 1/2005 | Adler | B65D 88/14 |
| | | | | 220/1.5 |
| 2016/0137404 | A1* | 5/2016 | Steiner | B61D 9/14 |
| | | | | 220/1.5 |
| 2016/0160515 | A1* | 6/2016 | Wallance | E04F 10/10 |
| | | | | 52/745.02 |

* cited by examiner

CONTAINER ENERGY STORAGE SYSTEM

CROSS-REFERENCE TO RELATED APPLICATION

This application claims priority to Taiwan Application Ser. No. 108215955, filed on Nov. 29, 2019, which is herein incorporated by reference.

BACKGROUND

Field of Invention

The present invention relates to a container energy storage system. More particularly, the present invention relates to an opening container energy storage system.

Description of Related Art

In general energy storage containers, the batteries or the power generators are disposed in closed containers, and the closed environment makes the system need to be equipped with more air conditioner to diffuse heat during operation. Moreover, if all of the batteries are disposed in the closed containers, there is a risk of spread when a fire occurs. There are known technologies to use the outdoor cabinets or the combined base stations to solve the problem of traditional container energy storage systems. However, the outdoor cabinets or the combined base stations during transportation also raise the problem of higher transportation costs. Therefore, the container energy storage system solving aforesaid problem is required.

SUMMARY

The invention provides a container energy storage system. The container energy storage system comprises a container and a plurality of functional assemblies. The container comprises a container frame and a bottom plate. The container frame is formed with a plurality of openings and a hollow main body. The bottom plate is disposed at the bottom of the container frame and is fixedly connected to the container frame. The plurality of functional assemblies are disposed in the hollow main body and located above the bottom plate.

The invention provides a container energy storage system. The container energy storage system comprises a container and a plurality of functional assemblies. The container comprises a container frame. The container frame is formed with a plurality of openings and a hollow main body. The plurality of functional assemblies is disposed in the hollow main body.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference labels are used in the drawings and the description to refer to the same or like parts, components, or operations.

Figure 1:
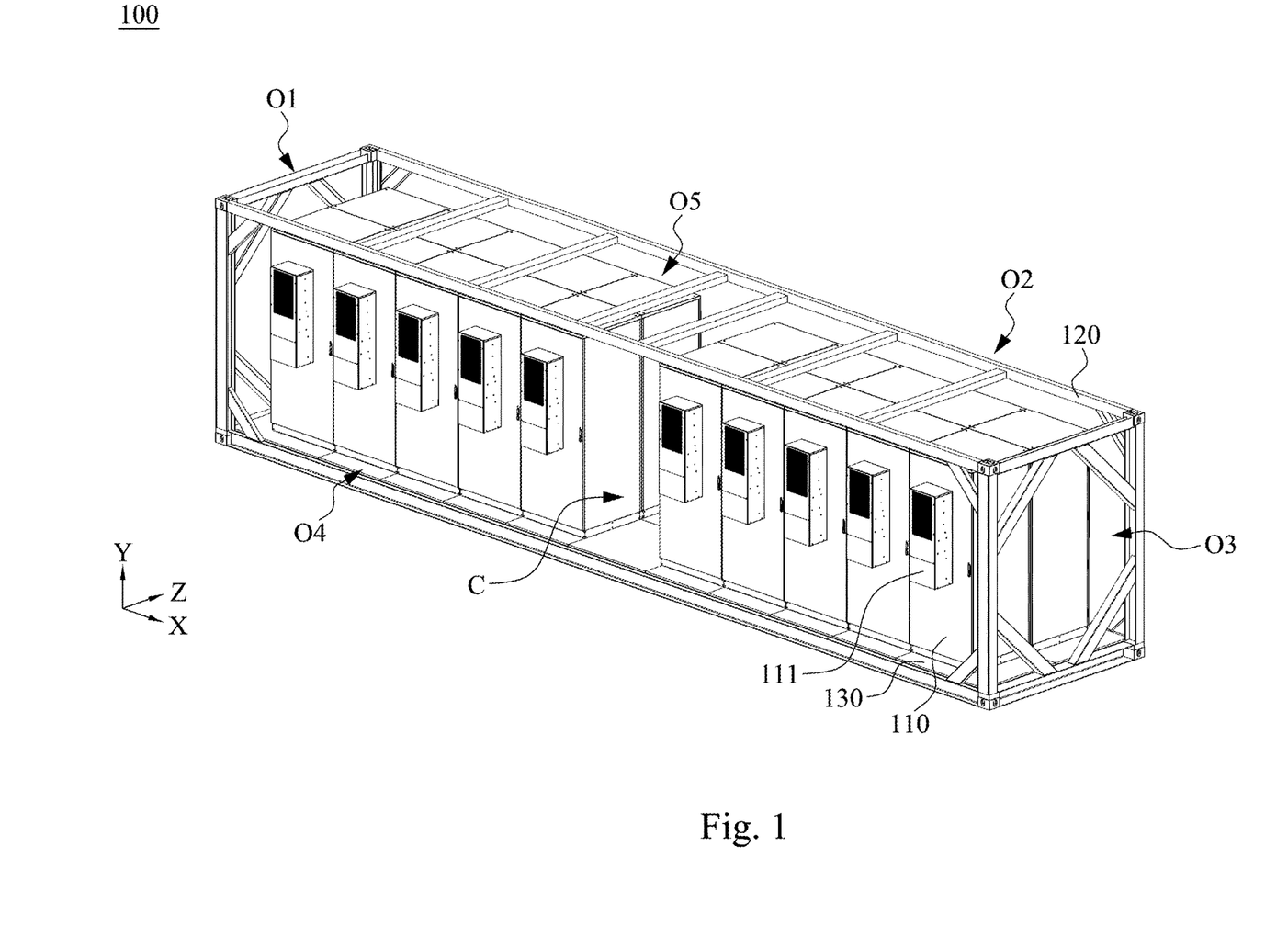
FIG. 1 is a functional block diagram of a container energy storage system according to one embodiment of the present disclosure.

Reference is made to FIG. 1, which is a functional block diagram of a container energy storage system 100 according to one embodiment of the present disclosure. As shown in FIG. 1, the container energy storage system 100 includes a container and a plurality of functional assemblies 110. The container includes a container frame 120 and a bottom plate 130. The container frame 120 is formed with a plurality of openings O1~O5 and a hollow main body C. The bottom plate 130 is disposed at the bottom of the container frame 120 and is fixedly connected to the container frame 120. The functional assemblies 110 are disposed in the hollow main body C and located above the bottom plate 130.

Afterwards, the openings O1 and O3 are located in two parallel planes defined by the container frame 120 in the directions Y and Z, respectively, and the openings O1 and O3 communicate in the direction X. The openings O2 and O4 are located in two parallel planes defined by the container frame 120 in the directions X and Y, respectively, and the openings O2 and O4 communicate in the direction Z. The opening O5 is located in a plane defined by the container frame 120 in the directions X and Z, and the opening O5 is substantially parallel with the plane defined by the bottom plate 130.

Afterwards, the functional assemblies 110 further include an air conditioning system 111, the air conditioning system 111 is configured to cool the components in the functional assemblies 110 and prevent the components in the functional assemblies 110 from being burned due to overheating. It is noticed that when the air condition system is operating, the waste heat will be generated. Thus, the waste heat generated by the air condition system can be directly diffused out of the container frame through the openings O1~O5.

In the embodiment, the housing of the functional assemblies 110 has a water-resistant material and a dust-resistant material. The housing of the functional assemblies 110 is configured to prevent the environmental dust, rain, or dew from entering the device. The functional assemblies 110 can be implemented by the energy storage device, the power converter, the fire box, the switchboard, the transformer, or the system controller device, but the present disclosure is not limited thereto.

In the embodiment, as shown in FIG. 1, the container frame 120 can be implemented by the twenty-foot equivalent unit (TEU). In another embodiment, the container frame 120 can be implemented by the forty-foot equivalent unit (FEU), but the present disclosure is not limited thereto. It is noticed that the container frame 120 conforms to the ISO's container standard, and the container frame 120 can be seemed as the equivalent unit.

Afterwards, because the container frame 120 conforms to the ISO's container standard, the container frame 120 can regarded as a general container for transportation, when the container energy storage system 100 is transported after the functional assemblies 110 mounting in the container frame 120. It can achieve the effect of reducing the transportation cost of the energy storage system and reducing the time of setting the wires.

Figure 2A:
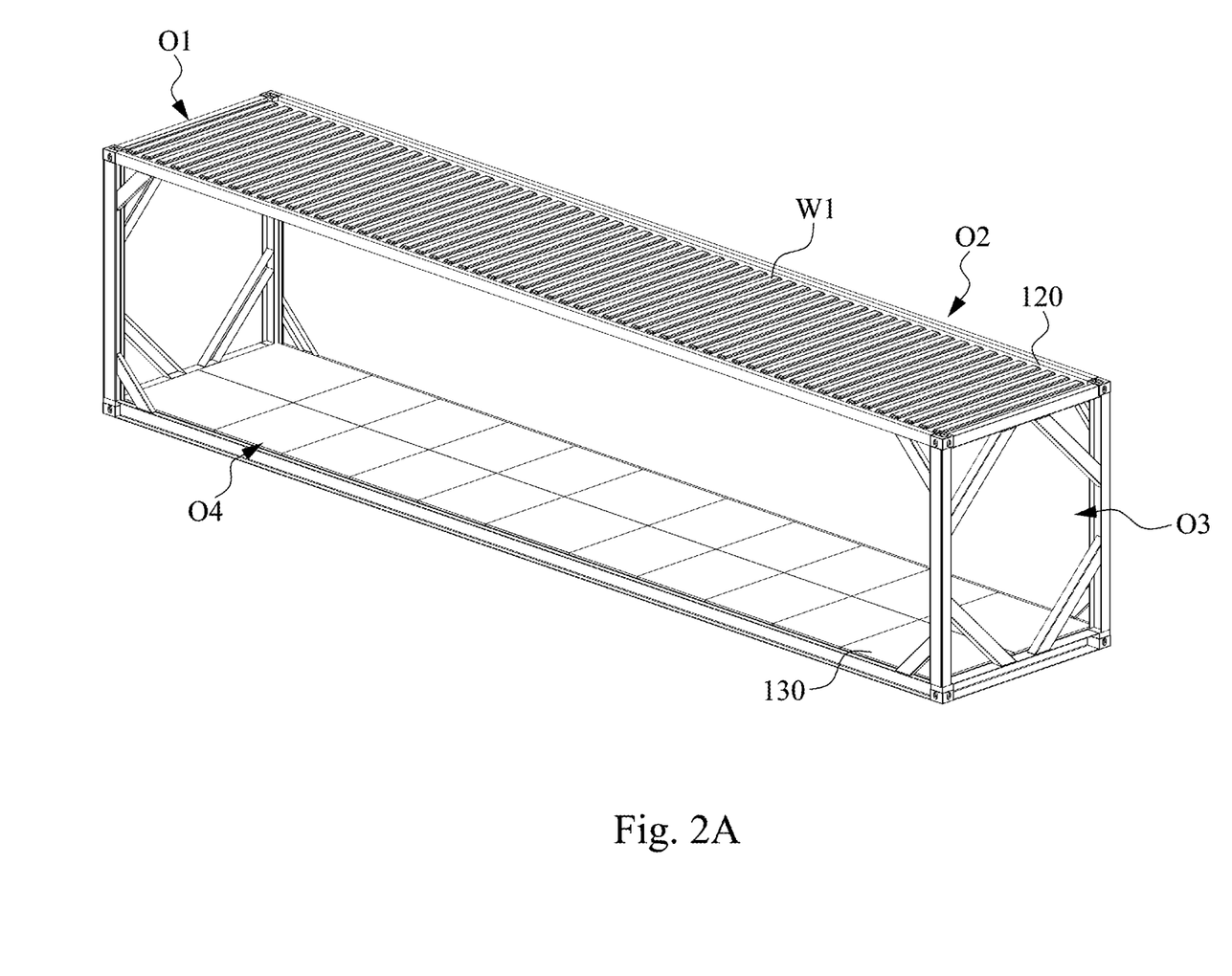
FIG. 2A is a functional block diagram of a container according to one embodiment of the present disclosure.

Reference is made to FIG. 2A, which is a functional block diagram of a container according to one embodiment of the present disclosure. As shown in FIG. 2A, the container further includes a wall body W1. In the embodiment, the wall body W1 is disposed on a top of the container frame 120 to form a first container surface. The wall body W1 is configured to cover the opening O5 shown in FIG. 1 and is fixedly connected to the container frame 120. Thus, in this case, the container includes four openings O1~O4.

Figure 2B:
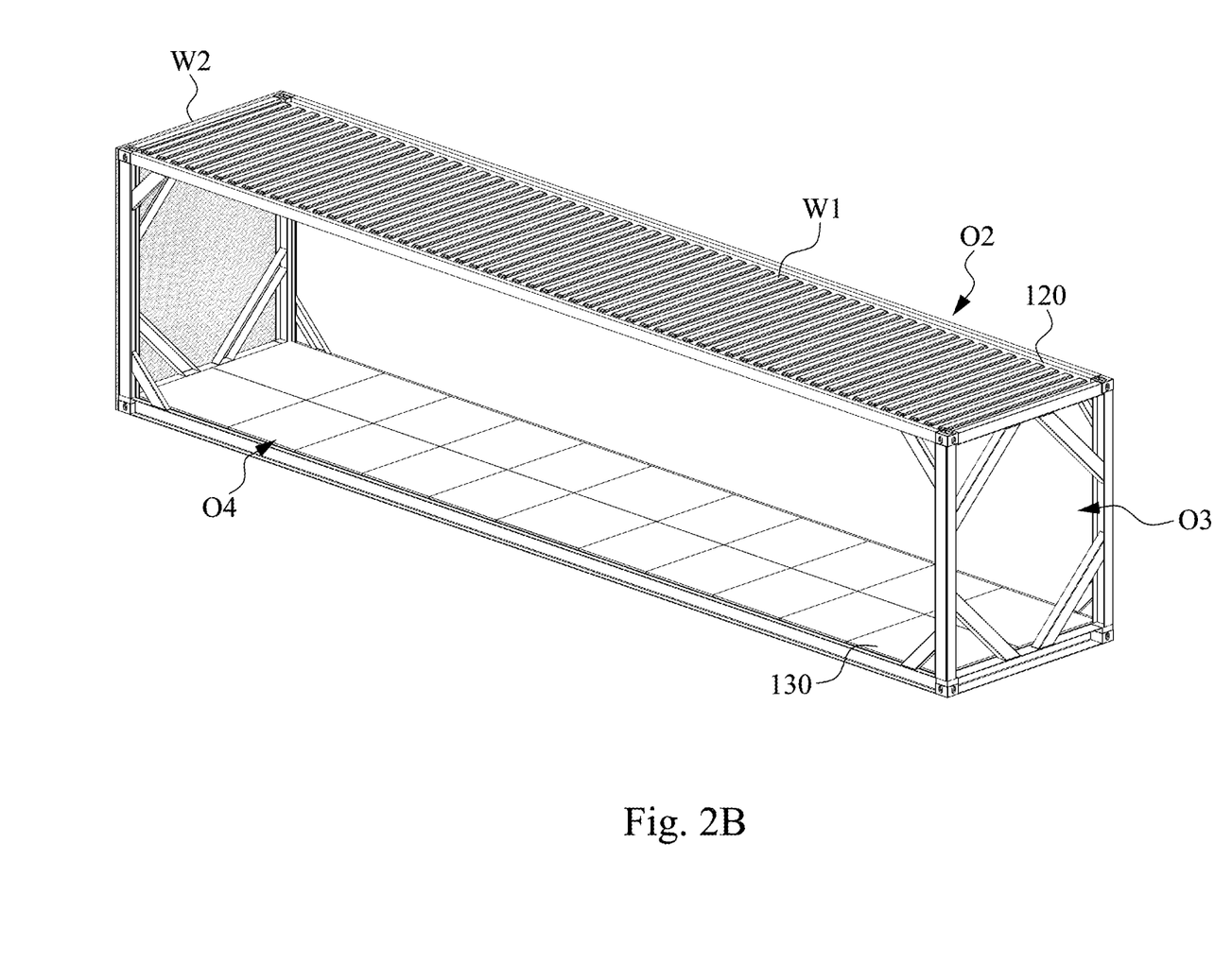
FIG. 2B is a functional block diagram of a container according to another embodiment of the present disclosure.

Reference is made to FIG. 2B, which is a functional block diagram of a container according to another embodiment of the present disclosure. As shown in FIG. 2B, the container further includes a wall body W2. In the embodiment, the wall body W2 is disposed on a side of the container frame 120 to form a second container surface. The wall body W2 is configured to cover the opening O1 shown in FIG. 1 and is fixedly connected to the container frame 120. Thus, in this case, the container includes three openings O2~O4.

Figure 2C:
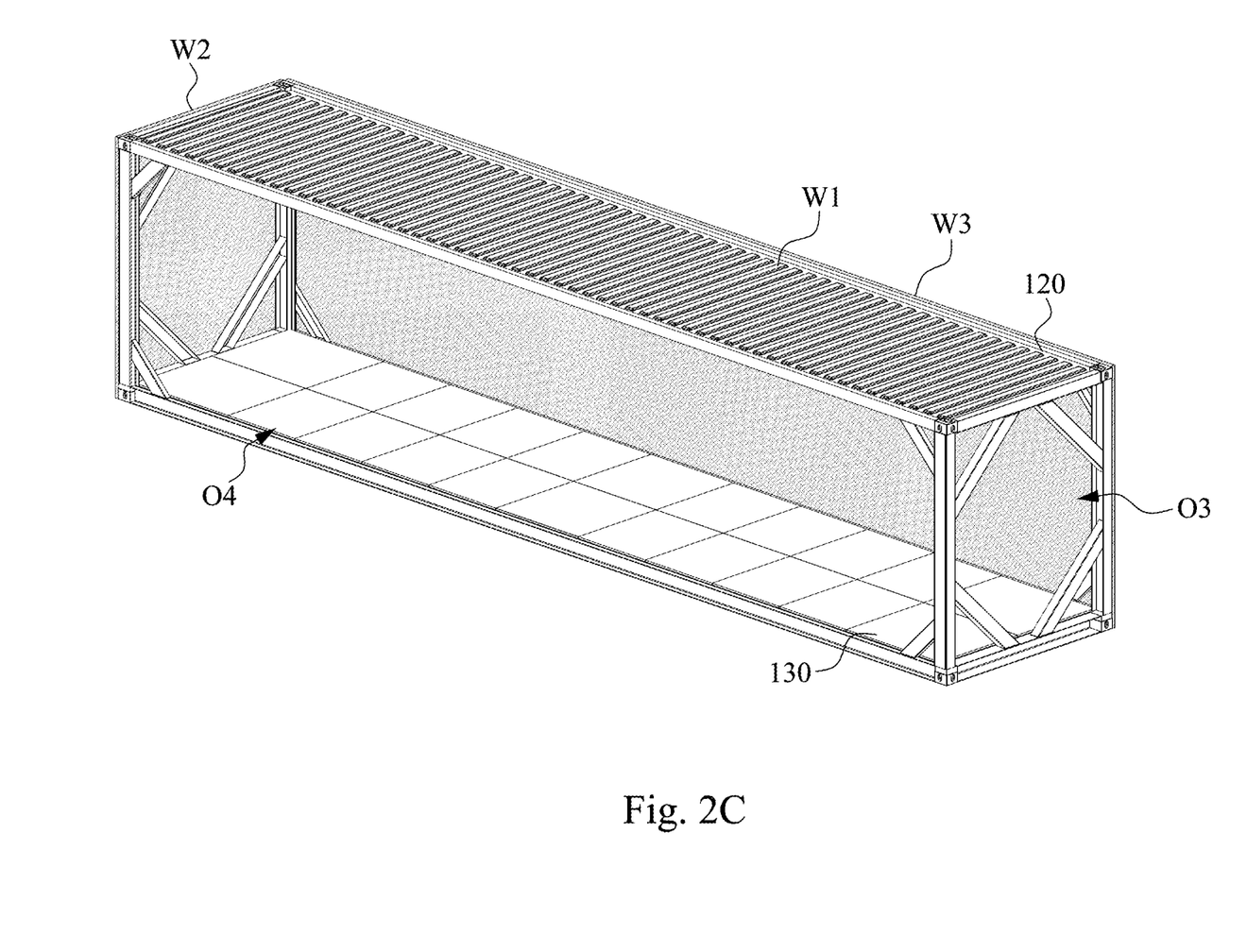
FIG. 2C is a functional block diagram of a container according to the other embodiment of the present disclosure.

Reference is made to FIG. 2C, which is a functional block diagram of a container according to the other embodiment of the present disclosure. As shown in FIG. 2C, the container further includes a wall body W3. In the embodiment, the wall body W3 is disposed on the other side of the container frame 120 to form a third container surface. The wall body W3 is configured to cover the opening O2 shown in FIG. 1 and is fixedly connected to the container frame 120. Thus, in this case, the container includes two openings O3~O4.

Afterwards, because the opened container frame 120 has multiple openings, the waste heat generated by the functional assemblies 110 is diffused out of the outer environment. The opened container frame 120 can integrate a high-power power conditioner (PCS) and a high-power power converter into the space inside the container frame 120, and thus the waste heat generated by the high-power power conditioner and the high-power power converter can be directly diffused into the environment outside the container frame 120.

Figure 3:
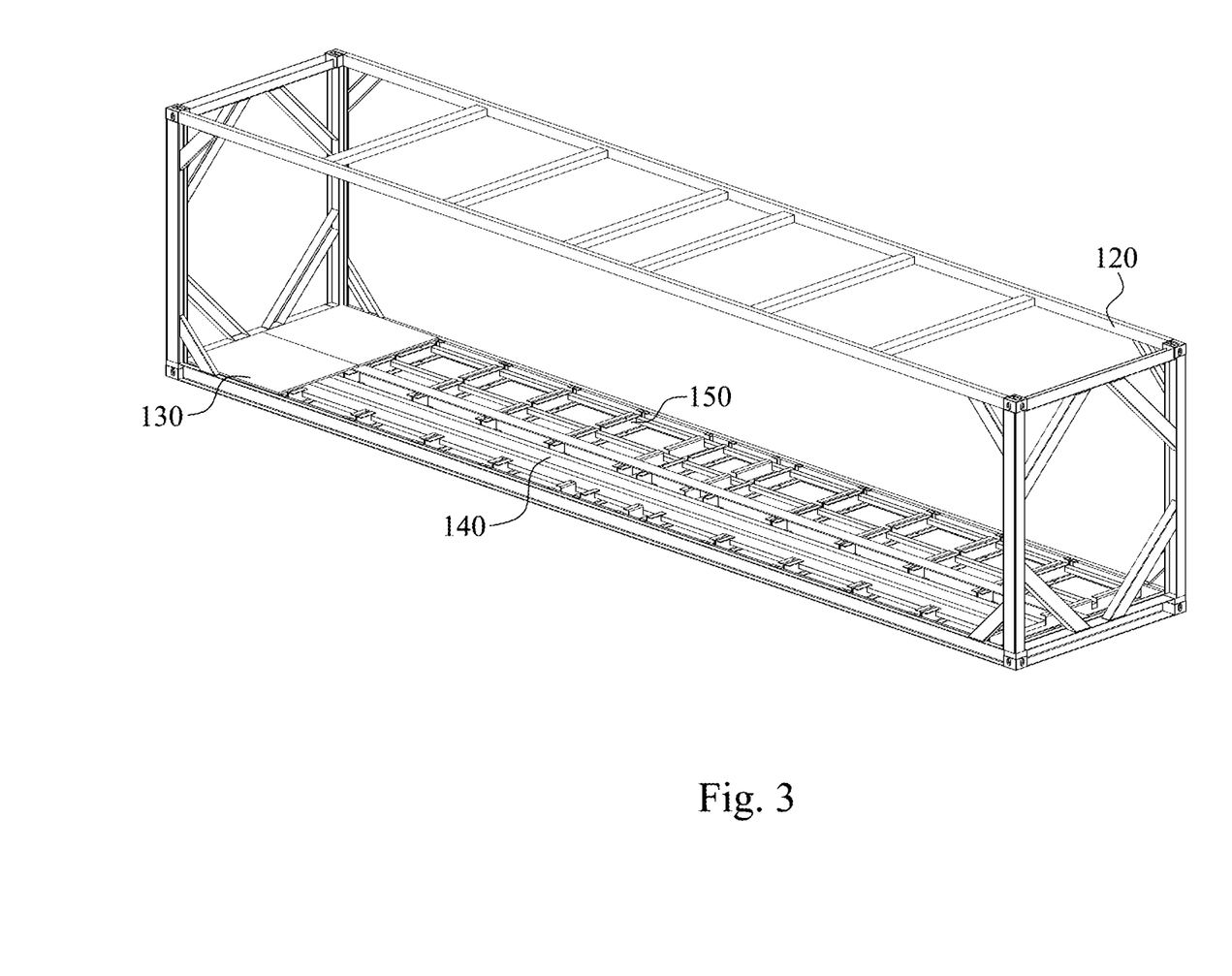
FIG. 3 is a functional block diagram of a bus and a wiring slot according to the other embodiment of the present disclosure.

Reference is made to FIG. 3, which is a functional block diagram of a bus and a wiring slot according to the other embodiment of the present disclosure. As shown in FIG. 3, the container further includes a bus 140 and a wiring slot 150. In the embodiment, the bus is configured to connect the functional assemblies 110 (not shown in FIG. 3) so that the functional assemblies 110 can transmit power and electrical signals to each other. The wiring slot 150 is configured to place multiple conducting wires, and the conducting wires are electrically connected to adjacent functional assemblies 110. It is noticed that a the bottom plate 130 is disposed above the bus 140 and the wiring slot 150, and the functional assemblies 110 are disposed on the bottom plate 130.

Afterwards, the high-voltage electric power line, the auxiliary power lines, the communication lines or other similar components can be set inside the wiring slot 150. It is noticed that a plurality of lock units (not shown in FIG. 3) is disposed on the bottom plate 130, and the lock units are configured to fix the functional assemblies 110. The bottom plate 130 has multiple holes corresponding to the functional assemblies 110, so that the functional assemblies 110 can be connected to the wires set in the bus 140 and the wiring slot 150.

Afterwards, in another embodiment, the bus 140 can also be directly attached to the inner wall of the container frame 120. Similarly, the wiring slot 150 can be installed inside the container frame 120. It is noticed that the setting of the bus 140 and the wiring slot 150 can be adjusted according to the placement position of the functional assemblies 110, but the present disclosure is not limited thereto.

Figure 4:
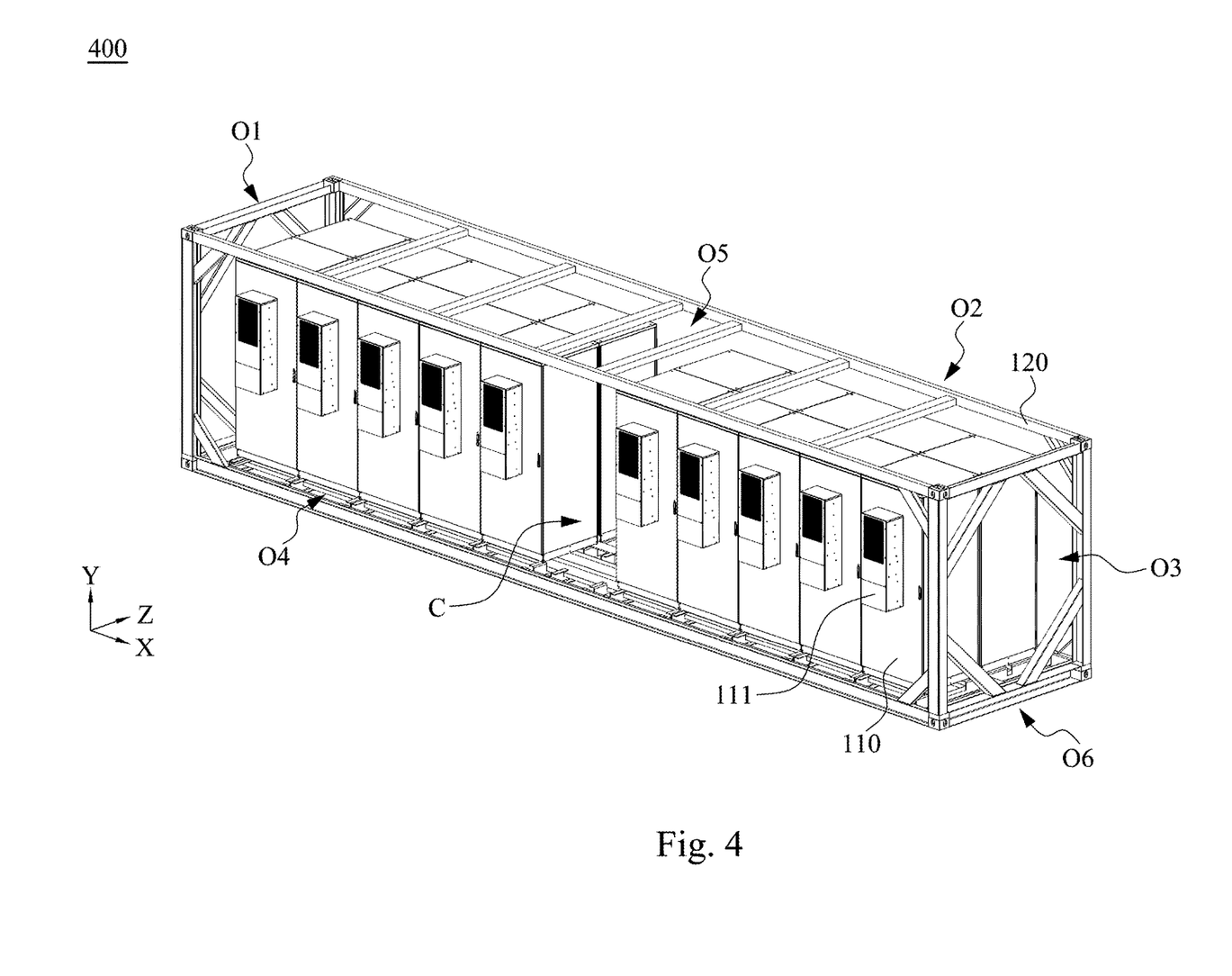
FIG. 4 is a functional block diagram of a container energy storage system according to another embodiment of the present disclosure.

Reference is made to FIG. 4, which is a functional block diagram of a container energy storage system 400 according to another embodiment of the present disclosure. The difference between the embodiment shown in FIG. 1 and the embodiment shown in FIG. 4 is that the embodiment shown in FIG. 4 lacks the bottom plate 130. The container only includes a container frame 120. The container frame 120 is formed with a plurality of openings O1~O6 and a hollow main body C. The openings O1 and O3 are located in two parallel planes defined by the container frame 120 in the directions Y and Z, respectively, and the openings O1 and O3 communicate in the direction X. The openings O2 and O4 are located in two parallel planes defined by the container frame 120 in the directions X and Y, respectively, and the openings O2 and O4 communicate in the direction Z. The openings O5 and O6 are located in two parallel planes defined by the container frame 120 in the directions X and Z, respectively, and the openings O5 and O6 communicate in the direction Y.

As can be appreciated from the foregoing embodiments, it is utilized the container frame 120 conformed to the ISO's container standard to improve the disadvantages of higher transportation costs of the combined energy storage base station. Because of the advantages of the opened container frame, the waste heat generated by the functional assemblies during operation can be directly diffused into the environment. Therefore, the disclosure is capable of improving the disadvantages of closed energy storage containers in prior art that are difficult to diffuse heat, and achieving the effect of reducing transportation costs and improving heat diffusion capacity.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A container energy storage system, comprising:
a container, comprising:
a container frame, formed with a plurality of openings and a hollow main body;
the bottom plate, disposed at the bottom of the container frame and fixedly connected to the container frame; and
a wiring slot, configured to place a plurality of conducting wires; and
a plurality of functional assemblies, disposed in the hollow main body and located above the bottom plate, the plurality of conducting wires being electrically connected to adjacent ones of the functional assemblies.

2. The container energy storage system of claim 1, wherein the container further comprises:
a first wall body, disposed on a top of the container frame to form a first container surface, wherein the first wall body is configured to cover one of the plurality of openings and is fixedly connected to the container frame.

3. The container energy storage system of claim 2, wherein the container further comprises:
a second wall body, disposed on a side of the container frame to form a second container surface, wherein the second wall body is configured to cover another one of the plurality of openings and is fixedly connected to the container frame.

4. The container energy storage system of claim 3, wherein the container further comprises:
a third wall body, disposed on an other side of the container frame to form a third container surface, wherein the third wall body is configured to cover the other one of the plurality of openings and is fixedly connected to the container frame.

5. The container energy storage system of claim 1, wherein the container further comprises:
a bus, configured to connect the plurality of functional assemblies.

6. The container energy storage system of claim 1, wherein the bottom plate is disposed above the bus and the wiring slot.

7. The container energy storage system of claim 1, wherein the plurality of functional assemblies has a water-resistant material and a dust-resistant material.

8. The container energy storage system of claim 1, wherein the plurality of functional assemblies comprises an energy storage device, a power converter, a fire box, a switchboard, a transformer, or a system controller device.

9. The container energy storage system of claim 1, wherein the container frame is an equivalent unit.

* * * * *